United States Patent
Zheng et al.

(10) Patent No.: US 9,444,896 B2
(45) Date of Patent: Sep. 13, 2016

(54) APPLICATION MIGRATION BETWEEN CLOUDS

(71) Applicant: Microsoft Licensing Technology, LLC, Redmond, WA (US)

(72) Inventors: Yuan Zheng, Redmond, WA (US); David James Armour, Bellevue, WA (US); Stephen Jason Baron, Sammamish, WA (US); Erik Stefan Nyström, Uttran (SE); John David Welch, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 13/706,231

(22) Filed: Dec. 5, 2012

(65) Prior Publication Data

US 2014/0156813 A1 Jun. 5, 2014

(51) Int. Cl.
*H04L 29/08* (2006.01)

(52) U.S. Cl.
CPC ............ *H04L 67/16* (2013.01); *H04L 67/10* (2013.01); *H04L 67/34* (2013.01)

(58) Field of Classification Search
CPC .................. G06F 2009/4557; G06F 9/5072; G06F 8/76; G06F 2212/163; G06F 17/30082; G06F 17/30156; G06F 17/302; G06F 17/30215; G06F 2003/0697; G06F 3/0605; G06F 3/0631; G06F 3/0667; G06F 3/067; G06F 11/202; G06F 11/3006; G06F 11/301; G06F 11/3082; G06F 11/03; G06F 11/3485; G06F 17/3002; H04L 29/08981; H04L 41/00; H04L 41/08; H04L 41/22; H04L 63/0428; H04L 67/02; H04L 67/1095; H04L 67/1097; H04L 67/22; H04L 67/28; H04L 67/2852; H04L 69/08; H04L 29/06; H04L 29/08099; H04L 43/08; H04L 43/0829; H04L 67/10; H04L 67/16; H04L 67/34; H04L 43/0894; H04L 61/103

USPC ........................................................ 709/220
See application file for complete search history.

(56) References Cited

U.S. PATENT DOCUMENTS

| 5,881,268 A | 3/1999 | McDonald et al. |
| 6,029,258 A | 2/2000 | Ahmad |

(Continued)

FOREIGN PATENT DOCUMENTS

| WO | WO 2011091056 | 7/2011 |
| WO | WO 2012000850 | 1/2012 |

OTHER PUBLICATIONS

"Appzero Cloud", Retrieved on: Sep. 11, 2012, Available at: http://www.appzero.com/content/appzero-cloud-0.

(Continued)

*Primary Examiner* — Kevin Bates
*Assistant Examiner* — Ranjan Pant
(74) *Attorney, Agent, or Firm* — Henry Gabryjelski; Doug Barker; Micky Minhas (57) ABSTRACT

Embodiments described herein are directed to reinitiating an application on a target computing cloud and to evaluating potential target cloud computing systems. In one scenario, a computing system receives an indication that identifies a target cloud for application migration. The target cloud computing system includes a specified set of hardware and/or environment specifications, associated configuration settings and an assigned rating that indicates how well the application will perform on the target cloud computing system. The computing system determines that the application is to be reconfigured for compatibility with the target cloud computing system and reconfigures some or all of the application to comply with the hardware and/or environment specifications and configuration settings of the target cloud computing system. The computing system also identifies and transfers specified portions of the application to the target cloud, and indicates that the application is to be re-instantiated using the transferred application portions.

20 Claims, 5 Drawing Sheets

(56) References Cited

U.S. PATENT DOCUMENTS

| | | | |
|---|---|---|---|
| 6,282,535 B1 | 8/2001 | Pham et al. | |
| 6,493,323 B1 | 12/2002 | Dobrowolski et al. | |
| 6,907,395 B1 | 6/2005 | Hunt et al. | |
| 7,035,930 B2 | 4/2006 | Graupner et al. | |
| 7,231,436 B1 | 6/2007 | Dalfo et al. | |
| 7,441,021 B1 | 10/2008 | Perry | |
| 7,774,446 B2 | 8/2010 | Nedelcu et al. | |
| 7,844,908 B2 | 11/2010 | Kodosky et al. | |
| 7,962,918 B2* | 6/2011 | Schaefer | G06F 9/44505 707/694 |
| 8,055,738 B2 | 11/2011 | Shah et al. | |
| 8,166,477 B1* | 4/2012 | Tormasov | G06F 9/4418 718/1 |
| 8,612,577 B2 | 12/2013 | Ferris et al. | |
| 8,649,762 B1 | 2/2014 | Miller et al. | |
| 8,875,041 B1 | 10/2014 | Desai et al. | |
| 2002/0124245 A1 | 9/2002 | Maddux et al. | |
| 2003/0055919 A1 | 3/2003 | Fong et al. | |
| 2004/0078373 A1 | 4/2004 | Ghoneimy et al. | |
| 2004/0153869 A1 | 8/2004 | Marinelli et al. | |
| 2004/0225952 A1 | 11/2004 | Brown et al. | |
| 2005/0027846 A1 | 2/2005 | Wolfe et al. | |
| 2005/0049906 A1 | 3/2005 | Leymann et al. | |
| 2005/0096959 A1 | 5/2005 | Kumar et al. | |
| 2005/0149908 A1 | 7/2005 | Klianev | |
| 2006/0069621 A1 | 3/2006 | Chang et al. | |
| 2006/0248522 A1 | 11/2006 | Lakshminarayanan | |
| 2006/0250578 A1 | 11/2006 | Pohl et al. | |
| 2008/0040455 A1 | 2/2008 | MacLeod et al. | |
| 2008/0120121 A1 | 5/2008 | Gilbert et al. | |
| 2008/0201454 A1 | 8/2008 | Soffer | |
| 2009/0217248 A1 | 8/2009 | Bently et al. | |
| 2009/0271472 A1 | 10/2009 | Scheifler et al. | |
| 2010/0094652 A1 | 4/2010 | Dorsett | |
| 2010/0138822 A1 | 6/2010 | Miyazaki | |
| 2010/0287280 A1* | 11/2010 | Sivan | G06F 9/5072 709/226 |
| 2011/0131329 A1 | 6/2011 | Kaplinger et al. | |
| 2011/0137805 A1 | 6/2011 | Brookbanks et al. | |
| 2011/0138048 A1 | 6/2011 | Dawson et al. | |
| 2011/0145392 A1 | 6/2011 | Dawson et al. | |
| 2011/0145413 A1 | 6/2011 | Dawson et al. | |
| 2011/0145439 A1 | 6/2011 | Chaturvedi et al. | |
| 2011/0270968 A1* | 11/2011 | Salsburg | G06F 9/5072 709/224 |
| 2011/0276951 A1 | 11/2011 | Jain | |
| 2011/0289493 A1 | 11/2011 | Keefe et al. | |
| 2011/0307486 A1 | 12/2011 | Breslau et al. | |
| 2011/0307780 A1 | 12/2011 | Harris et al. | |
| 2011/0314082 A1 | 12/2011 | Koneti et al. | |
| 2011/0320606 A1 | 12/2011 | Madduri et al. | |
| 2012/0030318 A1 | 2/2012 | Ryder | |
| 2012/0030343 A1 | 2/2012 | Ryder | |
| 2012/0042162 A1 | 2/2012 | Anglin et al. | |
| 2012/0054551 A1 | 3/2012 | Gao et al. | |
| 2012/0066667 A1 | 3/2012 | Mascaro et al. | |
| 2012/0066769 A1 | 3/2012 | Latchem et al. | |
| 2012/0072555 A1 | 3/2012 | DeLuca et al. | |
| 2012/0072709 A1 | 3/2012 | Joukov et al. | |
| 2012/0072914 A1 | 3/2012 | Ota | |
| 2012/0079470 A1 | 3/2012 | Fukatsu | |
| 2012/0096149 A1 | 4/2012 | Sunkara et al. | |
| 2012/0102103 A1 | 4/2012 | Jacobson et al. | |
| 2012/0110044 A1 | 5/2012 | Nagpal et al. | |
| 2012/0130778 A1 | 5/2012 | Cotton et al. | |
| 2012/0137002 A1 | 5/2012 | Ferris et al. | |
| 2012/0137003 A1* | 5/2012 | Ferris | H04W 4/003 709/226 |
| 2012/0189004 A1 | 7/2012 | Hendel | |
| 2012/0203823 A1 | 8/2012 | Manglik et al. | |
| 2012/0204187 A1 | 8/2012 | Breiter et al. | |
| 2012/0221535 A1 | 8/2012 | Dubbels et al. | |
| 2012/0221690 A1 | 8/2012 | Beaty et al. | |
| 2012/0222041 A1 | 8/2012 | Sabin et al. | |
| 2012/0233625 A1 | 9/2012 | Sabin et al. | |
| 2012/0239792 A1 | 9/2012 | Banerjee et al. | |
| 2012/0254433 A1 | 10/2012 | Gujral et al. | |
| 2012/0291011 A1 | 11/2012 | Quine | |
| 2012/0324070 A1 | 12/2012 | Campion et al. | |
| 2012/0331532 A1 | 12/2012 | Walters et al. | |
| 2013/0031136 A1 | 1/2013 | Shah | |
| 2013/0036100 A1 | 2/2013 | Nagpal et al. | |
| 2013/0042004 A1 | 2/2013 | Boss et al. | |
| 2013/0060838 A1 | 3/2013 | Yaffe | |
| 2013/0061220 A1 | 3/2013 | Gnanasambandam et al. | |
| 2013/0085989 A1* | 4/2013 | Nayyar | G06F 17/30079 707/610 |
| 2013/0151657 A1 | 6/2013 | Lehman et al. | |
| 2013/0185413 A1 | 7/2013 | Beaty et al. | |
| 2013/0232185 A1 | 9/2013 | Armour et al. | |
| 2013/0238772 A1 | 9/2013 | Armour et al. | |
| 2013/0268643 A1* | 10/2013 | Chang | G06F 9/45558 709/223 |
| 2013/0339419 A1* | 12/2013 | Emaru | G06F 9/4856 709/201 |
| 2013/0346572 A1* | 12/2013 | Jain | G06F 9/5088 709/223 |
| 2014/0040884 A1 | 2/2014 | Donahue | |
| 2014/0115161 A1* | 4/2014 | Agarwal | G06F 9/45558 709/226 |
| 2014/0149591 A1* | 5/2014 | Bhattacharya et al. | 709/226 |

OTHER PUBLICATIONS

"HP Cloud Maps Deliver Optimized Performance and Service Levels for Cloud Environments", Retrieved on: Sep. 11, 2012, Available at: http://www8.hp.com/us/en/business-solutions/solution.html?compURI=1216661#.UE2maLJITD8.

"A New Approach to Deploying and Managing JavaEE™ Applications", Published on: May 25, 2010, Available at: http://documents.bmc.com/products/documents/39/47/123947/123947.pdf.

Varia, Jinesh, "Amazon Web Services—Migrating Your Existing Applications to the AWS Cloud", Published on: Oct. 2010, Available at: http://media.amazonwebservices.com/CloudMigration-main.pdf.

Binz, et al., "CMotion: A Framework for Migration of Applications into and between Clouds", In Proceedings of IEEE International Conference on Service-Oriented Computing and Applications, Dec. 12, 2011, 4 pages.

Hnetynka et al. "Component Model for Unified Deployment of Distributed Component-based Software" 2004, Charles University, 13 pages. (The month of Publication is irrelevant because the year of application is clearly prior to the filing of the Application).

Lestideau "Towards Automated Software Component Configuration and Deployment" 2002, Domaine University, 2 pages. (The month of Publication is irrelevant because the year of Publication is clearly prior to the filing of the Application).

Perez, et al. "A Component-Based Software Infrastructure for Grid Computing"; html://www.ercim.org/publication/Ercim_News/enw59/Perez.html, Available at least as early as May 2006, 6 pages.

McCartney et al. "Application Development and Management in the Programmers' Playground", Published on Jun. 1998, Available at: http://citeseerx.ist.psu.edu/viewdoc/download?doi=10.1.1.29.5058&rep=rep1&type=pdf.

"Configuring Workflow", Retrieved on: Dec. 27, 2011, Available at: http://confluenceatlassian.com/display/JIRA/Configuring+Workflow.

Mitchell, Scott, "Creating Dynamic Data Entry User Interfaces", Published on: Dec. 2004, Available at: http://msdn.microsoft.com/en-us/library/aa479330.aspx.

Albrecht et al., "Remote Control: Distributed Application Configuration, Management, and Visualization with Plush." In USENIX Large Installation System Administration Conference (LISA), Nov. 2007.

"Cloud Computing—A Strategy Guide for Board Level Executives", Available at least as early as Dec. 2011, Available at <<http://download.microsoft.com/download/1/5/D/15DA1ED7-6005-4D18-A592-12EA315A3F4A/KynetixCloudComputingStrategyGuide.pdf>>.

(56) References Cited

OTHER PUBLICATIONS

"Cloudsoft's Monterey Middleware—An Implementation of Intelligent Application Mobility", Available at least as early as Dec. 2011, Available at <<http://cloudsoftcorp.com/wp-content/uploads/White-Paper-Monterey-Technical-Overview.pdf>>.

Crump, George, "Cloud Bursting with Distance VMotion", Published Jul. 2010, Available at <<http://www.storage-switzerland.com/articles/entries/2010/7/12_Cloud_Bursting_with_Distance_VMotion.html>>.

"Intel Cloud Builders Guide to Cloud Design and Deployment on Intel Platforms", Published Sep. 2011, Available at <<http://intelcloudbuilders.com/docs/Intel_Cloud_Builders_EMC_Secure_Onboarding2.pdf>>.

"Oracle Cloud Computing", In Oracle White Paper, May 2010, 22 pages.

"Cloud Balancing, Cloud Bursting, and Intercloud", Published Jul. 2009, Available at <<http://devcentral.f5.com/weblogs/macvittie/archive/2009/07/09/cloud-balancing-cloud-bursting-and-intercloud.aspx>>.

"Bursting the Cloud", Published Sep. 2008, Available at <<http://devcentral.f5.com/weblogs/macvittie/archive/2008/09/03/3584.aspx>>.

U.S. Appl. No. 11/463,217, Jul. 1, 2009, Office Action.
U.S. Appl. No. 11/463,217, Jan. 11, 2010, Office Action.
U.S. Appl. No. 11/463,217, Mar. 30, 2010, Office Action.
U.S. Appl. No. 11/463,217, Aug. 16, 2010, Office Action.
U.S. Appl. No. 11/463,217, Dec. 6, 2011, Office Action.
U.S. Appl. No. 11/463,217, May 10, 2012, Office Action.
U.S. Appl. No. 13/410,496, Jun. 25, 2013, Office Action.
U.S. Appl. No. 13/410,496, Dec. 10, 2013, Notice of Allowance.
U.S. Appl. No. 13/415,686, Apr. 7, 2014, Office Action.
U.S. Appl. No. 13/415,686, Nov. 6, 2014, Office Action.
U.S. Appl. No. 13/415,686, Feb. 27, 2015, Office Action.
Notice of Allowance dated Sep. 17, 2015 cited in U.S. Appl. No. 13/415,686.

* cited by examiner

APPLICATION MIGRATION BETWEEN CLOUDS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed for operation in distributed environments. For instance, applications may be designed so that one instance of the application runs on multiple different computer systems. Such applications may be said to be running on the "cloud." These applications are typically designed to run on a specific cloud, or set of computing systems. This set of computing systems typically has a specific set of rules and/or settings that are used for all applications running on those systems.

BRIEF SUMMARY

Embodiments described herein are directed to reinitiating an application on a target computing cloud and to evaluating potential target cloud computing systems. In one embodiment, a computing system receives an indication that identifies a target cloud computing system to which an application is to be migrated. The target cloud computing system includes a specified set of hardware specifications, a set of environment settings and associated configuration settings and an assigned rating that indicates how well the application will perform on the target cloud computing system. The computing system determines, based on the hardware specifications, the environment settings and the configuration settings of the target cloud computing system, that the application is to be reconfigured for compatibility with the target cloud computing system. Then, based on the determination, the computing system reconfigures some or all of the application to comply with the hardware specifications, the environment settings and/or the configuration settings of the target cloud computing system.

The computing system also identifies which portions of the application are to be transferred to the target cloud computing system based on the reconfiguration, transfers the identified application portions to the target cloud computing system and indicates to the target cloud computing system that the application is to be re-instantiated on the target cloud computing system using the transferred application portions. In cases where the computing system determines that equivalent application portions already exist on the target cloud computing system, a mapping of existing data may be used as an alternative to transferring the already-existing data.

In another embodiment, a computing system evaluates potential target cloud computing systems. The computing system determines that various cloud computing systems are available for hosting an application and evaluates the potential cloud computing systems to determine which cloud computing system an application is to be migrated to. Each cloud computing system includes a specified set of hardware specifications, a set of environment settings and associated configuration settings. The evaluation includes determining a service rating for each cloud computing system that indicates whether the application is hostable by the target cloud computing system and how well the application will perform on the target cloud computing system. The computing system also presents the available cloud computing systems to at least one user via a user interface, where each cloud computing system is presented with its corresponding service rating as determined by the evaluation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to reinitiating an application on a target computing cloud and to evaluating potential target cloud computing systems. In one embodiment, a computing system receives an indication that identifies a target cloud computing system to which an application is to be migrated. The target cloud computing system includes a specified set of hardware specifications, a set of environment settings, associated configuration settings and an assigned rating that indicates how well the application will perform on the target cloud computing system. The computing system determines, based on the hardware specifications, the environment settings and/or the configuration settings of the target cloud computing system, that the application is to be reconfigured for compatibility with the target cloud computing system. Then, based on the determination, the computing system reconfigures some or all of the application to comply with the hardware specifications, the environment settings and/or the configuration settings of the target cloud computing system. The computing system also identifies which portions of the application are to be transferred (or mapped if the data already exists on the target cloud) to the target cloud computing system based on the reconfiguration, transfers the identified application portions to the target cloud computing system and indicates to the target cloud computing system that the application is to be re-instantiated on the target cloud computing system using the transferred application portions.

In another embodiment, a computing system evaluates potential target cloud computing systems. The computing system determines that various cloud computing systems are available for hosting an application and evaluates the potential cloud computing systems to determine which cloud computing system an application is to be migrated to. Each cloud computing system includes a specified set of hardware specifications, a set of environment settings and associated configuration settings. The evaluation includes determining a service rating for each cloud computing system that indicates whether the application is hostable by the target cloud computing system and how well the application will perform on the target cloud computing system. The computing system also presents the available cloud computing systems to at least one user via a user interface, where each cloud computing system is presented with its corresponding service rating as determined by the evaluation.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
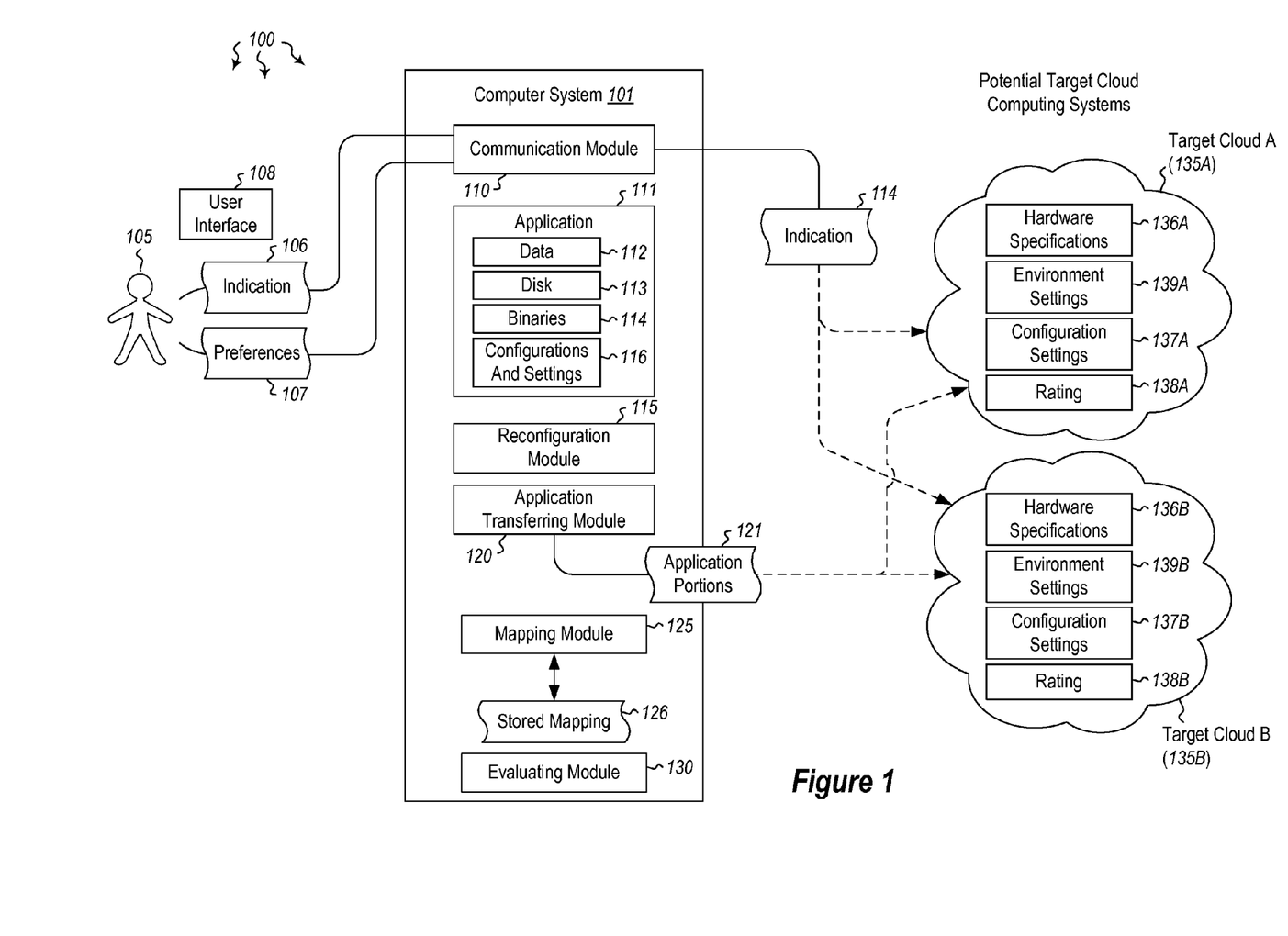
FIG. 1 illustrates a computer architecture in which embodiments described herein may operate including reinitiating an application on a target computing cloud and evaluating potential target cloud computing systems.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, the communications module 110 receives indications 106 and preferences 107 from user 105 and other users. It also sends selection indications 114 to the target clouds 135A and 135B. As used herein, a target cloud refers to a specific cloud that has been selected by a user or other computer system or program as the cloud on which an application (or a portion thereof) is to be re-instantiated. For instance, application 111 may be currently running on a cloud. The user 105 may desire to migrate that application (or portions thereof) to another cloud (e.g. 135A). The user may thus indicate to the computer system 101 that application 111 is to be migrated to target cloud 135A and then reinitiated on that cloud.

It should be understood that application 111 may include different types of data 112. The application may include application data used by the application during its execution. The application 111 may also include metadata describing the application and/or the virtual machine instance on which the application is running The application 111 may further include state data indicate the current (or previous stored) application states. The application may further include configurations and settings 116 that have been specified by a user or by an administrator such as a database connection string, a certificate to use for encryption, or a default error message. The application may be migrated to the target cloud in whole or in part. For example, the application transferring module 120 may transfer application portions 121 which may include application data, metadata and/or state data, it may include the entire application itself (e.g. a word processing application), or it may include a disk 113 on which the application is running (e.g. a virtual hard disk or a physical disk). Accordingly, transferring an application may include application data, the application itself (e.g. binaries 114) or the application's disk 113.

When the application 111 is transferred to the target cloud (e.g. 135A), various configuration settings, environment settings and hardware changes may be reconfigured for the new cloud. As such, reconfiguration module 120 may perform changes to application settings in order to allow the application to run on the target cloud. In other cases, a similar application may already exist on the target cloud. In such cases, similar components may be mapped (by mapping module 125) to existing components, and only the difference in files may be transferred.

Applications may thus move from a source cloud to a destination cloud regardless of cloud type or differences in cloud hardware or environment settings. Reconfiguration module 115 may apply changes that facilitate a smooth transition between clouds. Applications may be transferred from private clouds to public clouds, from public to private clouds, or from public to public clouds. Transferred applications may include those applications that span machine boundaries (i.e. distributed applications). Transferred application portions include virtual disks, metadata which defines the virtual machine instance (e.g. virtual machine size, network configurations, services running within the virtual machine, inter-machine structure, and other resources associated with the application (e.g. backup or monitoring)).

Regardless of the source or destination cloud type, application migration may include the following steps: assess, convert, map and fix up, package and transfer and redeploy. In the assess step, evaluation module 130 of the computer system 101 surveys each of the applications and clouds it manages, and gathers two sets of information: 1. Can the application be moved to another cloud? and 2. Should the application be moved to another cloud? Some platforms/clouds offer more capabilities than the others. For example, if an application requires two network adapters, clouds which do not support configuration of more than one network adapter will be rated "not applicable as a target cloud" for that application. In this step, the evaluation module may also determine whether the application can be deployed in more than one clouds it manages. The evaluation module also looks at whether an application might run faster, cheaper, or more securely in another cloud. Based on criteria set by users of the application such as cost, performance, geographic location, etc., the evaluation module recommends the best cloud for the application. It can also automatically start the application's migration to the recommended cloud.

In the convert, map, and fix up step, the computer system 101 converts the virtual machine on which the application is running, the application and associated settings or dependencies to the target cloud's format. The computer system then fixes up the application so it is ready to be reinitiated in the target cloud. If an equivalent resource exists in the target cloud, that resource can be mapped to the migrated application so the dependencies don't need to be re-transferred. Environment settings such as networking setting are mapped and the system fixes up the application if necessary. For example, drivers applied to the application's current cloud which are no longer needed by the target cloud are disabled. Drivers needed for the target cloud are automatically installed. The computer system knows the capability of clouds it manages. As such, it can recommend converted settings base on the original application settings. The computer system thus learns over time which settings are optimal, and can perform better default application transfer and reconfiguration.

If a dependency which was transferred to the target cloud previously is referred again, the computer system 101 automatically defaults to the existing to be mapped to instead being transferred again. Templates may be generated for procedures that are performed repeatedly. The convert, map, and fix up step can be performed before the application is transferred to the target cloud or after the application has been transferred to the target cloud.

In the package and transfer step, the computer system 101 implements the application transferring module 120 to move the selected or identified components of the application (e.g. 121). Other processes such as de-dupe, compression, or encryption may also be performed to make the transfer faster and more secure. In the redeploy step, the reconfigured, transferred application is then re-instantiated on the target cloud using target cloud application programming interfaces (APIs). These steps, along with the other concepts mentioned above, will be explained further below with regard to methods 200 and 300 of FIGS. 2 and 3, respectively.

Figure 2:
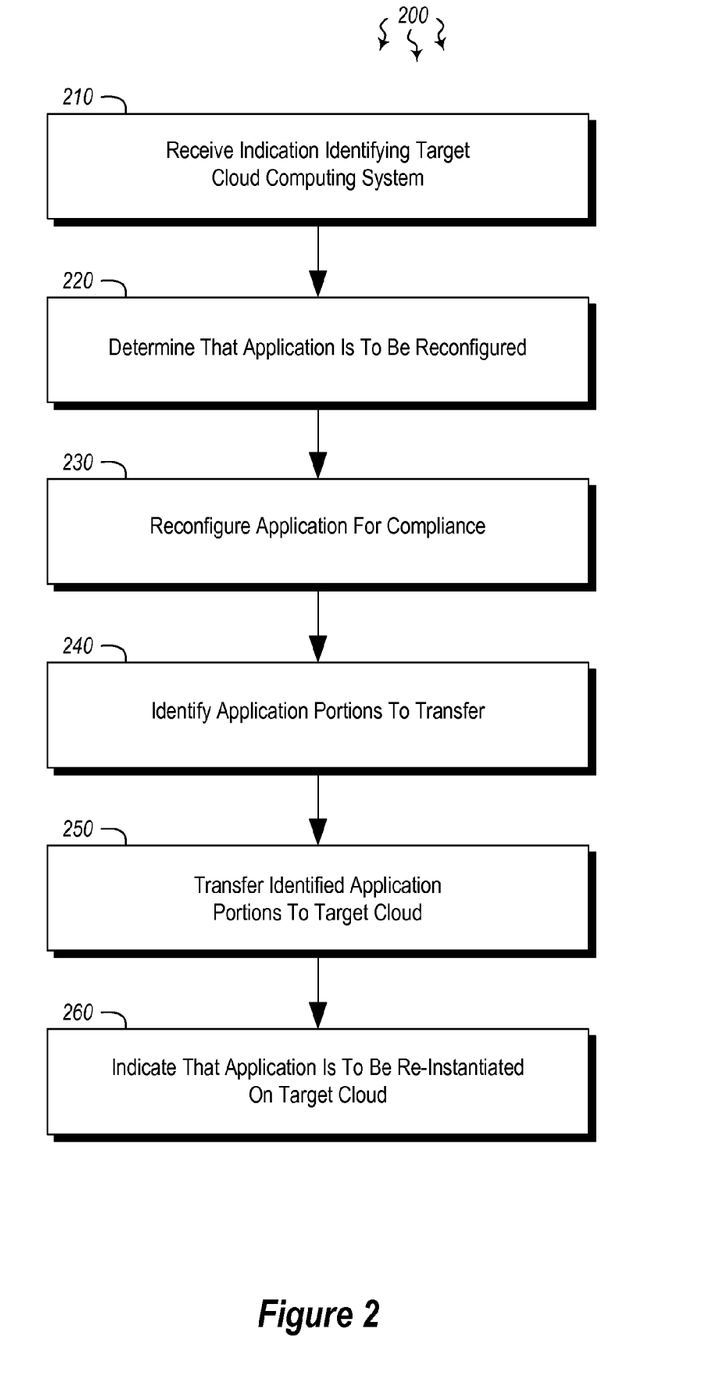
FIG. 2 illustrates a flowchart of an example method for reinitiating an application on a target computing cloud.
Figure 3:
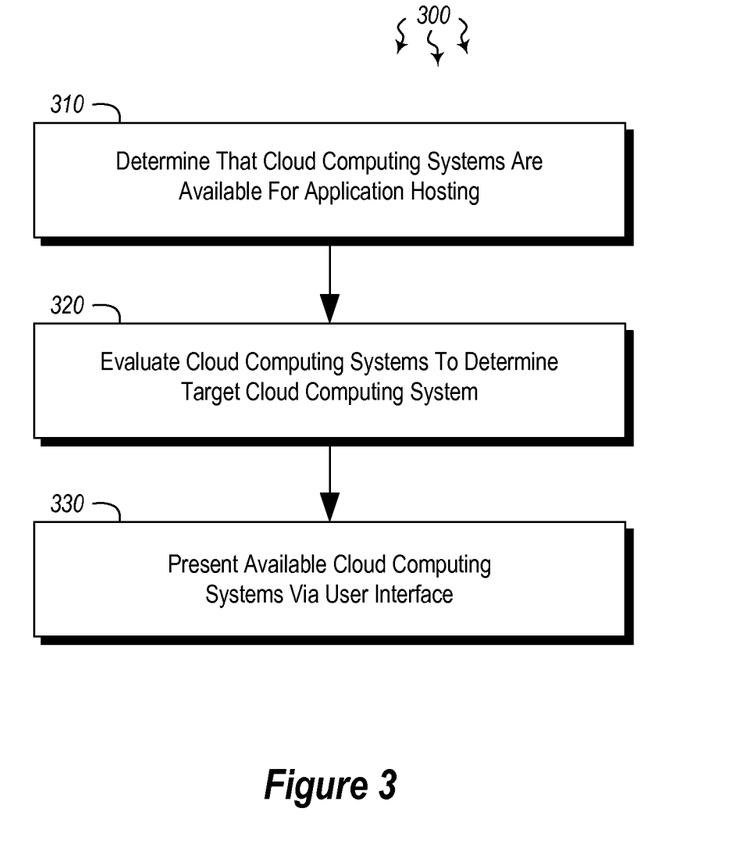
FIG. 3 illustrates a flowchart of an example method for evaluating potential target cloud computing systems.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for reinitiating an application on a target computing cloud. The method 200 will now be described with frequent reference to the components and data of environment 100.

Method 200 includes an act of receiving an indication that identifies a target cloud computing system to which an application is to be migrated, the target cloud computing system including a specified set of hardware specifications, a set of environment settings, one or more associated configuration settings and an assigned rating that indicates how well the application will perform on the target cloud computing system (act 210). For example, communication module 110 may receive indication 106 from user 105 identifying a target cloud computing system (e.g. target cloud 135B) to which application 111 (or portions thereof) is to be migrated.

Each target cloud includes a specified set of hardware specifications 136A/136B which may, for instance, include a number of processors, an amount of RAM, a number of network ports, an amount of storage space or any other physical resource. The target clouds also include a set of environment settings 139A/139B which may include a network type or a domain name system (DNS) namespace or authentication type. The target clouds further include a set of configuration settings indicating how things are configured on that cloud. Private and public clouds may have different settings. Clouds provided by different vendors will likely have different configuration settings. Each cloud will thus have its own set of hardware, environment and configuration settings. The target clouds will further have an assigned rating 138A/138B that indicates how well the application 111 will run on that cloud. The assigned rating may be generated based on various criteria including security, reliability, price, energy savings and/or other criteria. The target cloud computing systems are evaluated using the criteria to determine an optimal target cloud on which the application is to be reinitiated. The evaluation of target clouds will be explained in greater detail below with regard to method 300 of FIG. 3.

Method 200 further includes an act of determining, based on the hardware specifications, the environment settings and/or the configuration settings of the target cloud computing system, that the application is to be reconfigured for compatibility with the target cloud computing system (act 220). Thus, computer system 101 may look at the hardware, environment and configuration setting differences between the application's current host cloud and the selected target cloud (e.g. 135A) and determine that the application 111 is to be reconfigured in order to be compatible with the selected target cloud. Then, based on the determination, one or more portions of the application are reconfigured by reconfiguration module 115 to comply with the hardware specifications, the environment settings and/or the configuration settings of the target cloud computing system (act 230). The reconfiguration may include changing configuration settings, reallocating processors, RAM, network ports or other hardware to work as part of a new virtual machine in the target cloud. In cases where the application's disk 113 is transferred, a virtual machine on the target cloud may be instantiated or repurposed to run the virtual disk.

Method 200 further includes an act of identifying which one or more portions of the application are to be transferred to the target cloud computing system based on the reconfiguration (act 240). As mentioned above, various components of the application may be transferred individually, as a whole, or as part of a virtual hard disk. Accordingly, application 111 may be transferred with each of the components needed to execute the application, with the application data alone (112) and/or with the application's disk 113 (e.g. a virtual hard disk or a physical disk). These identified application portions 121 are then transferred to the target cloud computing system (act 250).

In some embodiments, multiple applications may be reconfigured and reinitiated on the target cloud computing system simultaneously. One or all of these applications may be compressed and/or encrypted for the transfer. In cases where two or more applications work together or where applications are dependent on each other, these applications may be transferred together along with an indication of their dependencies. In cases where only application data is transferred, the database storing the data (virtual or otherwise) may be transferred to the target cloud. When the application is transferred as a whole, the current application state may be transferred with it. If the application is a virtual application, the virtual application file itself may be transferred by the transferring module 120. When a virtual disk on which the application is running is transferred, the container for the virtual disk may be transferred and reconfigured to run on the target cloud.

Method 200 also includes an act of indicating to the target cloud computing system that the application is to be re-instantiated on the target cloud computing system using the transferred application portions (act 260). Thus, communication module 110 may indicate (via 114) to the selected target cloud computing system 135A/135B that the transferred application is to be re-instantiated on the target cloud. In cases where the application 111 (or portions thereof) already exist on the target cloud, those application portions may be mapped instead of being transferred.

Mapping the application to an existing application on the target cloud computing system may include the following steps: determining, based on the hardware specifications, the environment settings and/or the configuration settings of the target cloud computing system, that the application is to be mapped to one or more portions of an existing application on the target cloud computing system. Then, based on the determination, map the application to the one or more portions of the existing application on the target cloud computing system. Next, identify which portions of the application are to be transferred to the target cloud computing system based on the mapping, transfer the identified application portions to the target cloud computing system, and indicate to the target cloud computing system that the application is to be re-instantiated on the target cloud computing system using the mapped and transferred application portions.

In some cases, previously used mappings (e.g. stored mappings 126) may be used to map the application 111 to the one or more portions of the existing application on the target cloud computing system. The mappings may use names, tags, versions or other identifiers. The computer system 101 may be configured to remember past mappings for each user and learn over time which mappings are to be used. The system may also remember mappings based on user preferences 106. User-confirmed mappings may thus be used on subsequent application transfers for applications that are determined to be substantially similar. A library of stored mappings may be persisted on computer system 101 including mappings used by individual users, along with a global mappings library that is based on multiple different users' mappings.

In cases where subsequent actions are to be performed to reinitiate the application on the target cloud computing system (i.e. as part of fix-up), these actions may be performed to reinitiate the application on the target cloud computing system. These subsequent actions may include installing or removing drivers, providing new internet protocol (IP) addresses, or others. Thus, in this manner, applications (or portions thereof) may be transferred between different clouds, whether the clouds are private or public, are of different types or include different configurations. Evaluation of the target clouds will be described now with reference to FIG. 3.

FIG. 3 illustrates a flowchart of a method 300 for evaluating potential target cloud computing systems. The method 300 will now be described with frequent reference to the components and data of environment 100 of FIG. 1, as well as FIGS. 4 and 5.

Figure 5:
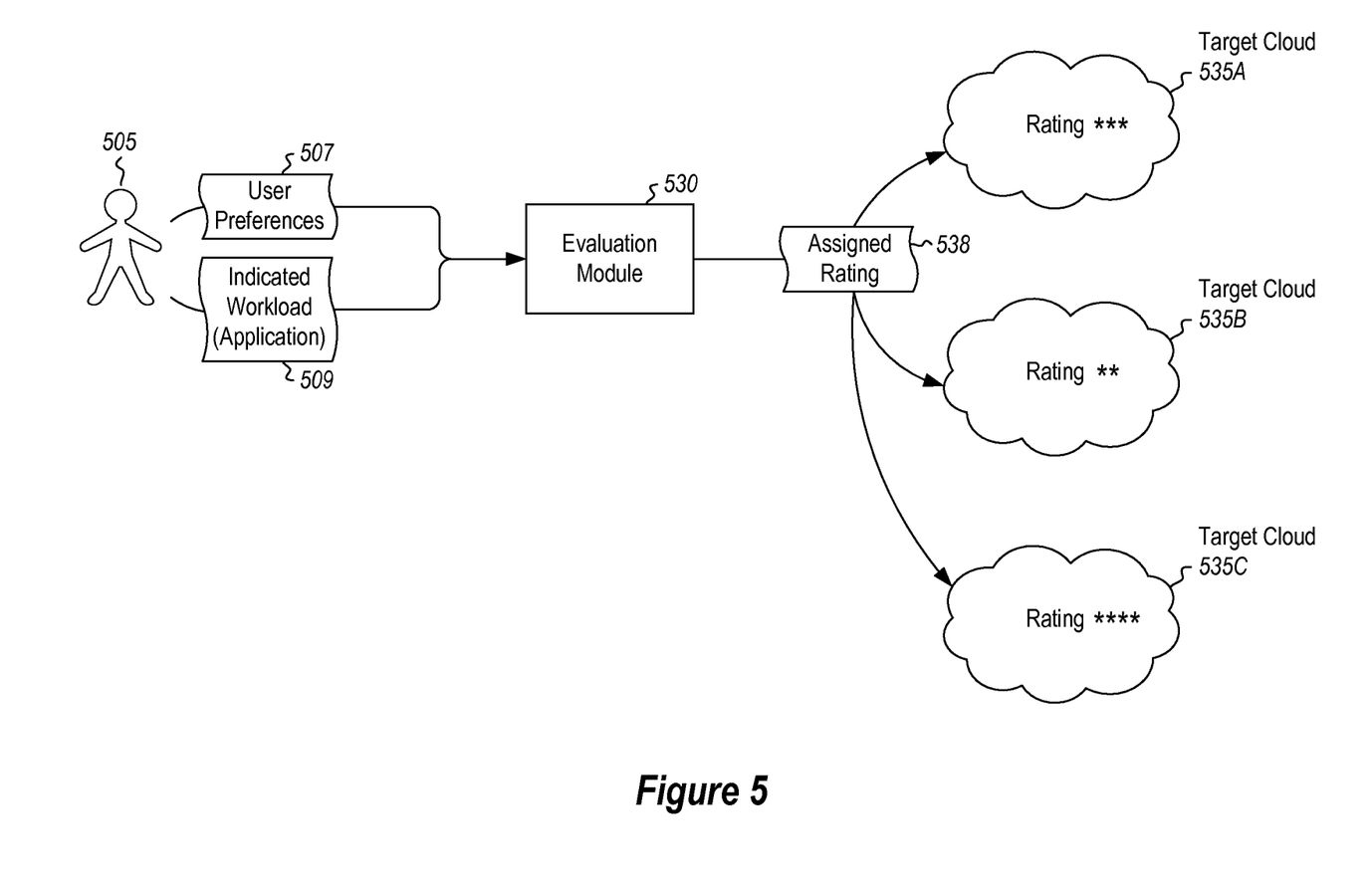
FIG. 5 illustrates an embodiment in which user preferences and application workload are used to generate a star rating for a target cloud.

Method 300 includes an act of determining that one or more cloud computing systems are available for hosting an application (act 310). For example, as shown in FIG. 5, three different target clouds may be available for hosting an application (535A, 535B and 535C). It will be understood that substantially any number of target clouds may be used in the embodiments described herein.

Method 300 next includes an act of evaluating the one or more cloud computing systems to determine which cloud computing system an application is to be migrated to, each cloud computing system including a specified set of hardware specifications, a set of environment settings and associated configuration settings, the evaluation comprising determining a service rating for each cloud computing system that indicates whether the application is hostable by the target cloud computing system and how well the application will perform on the target cloud computing system (act 320). The service rating may be determined based on the specified set of hardware specifications, the environment settings, the associated configuration settings of the cloud and/or an identified workload resulting from the application that is to be reinitiated on the target cloud. For instance, if one cloud has more processing resources, or better network connections, it may be prioritized over other clouds.

Figure 4:
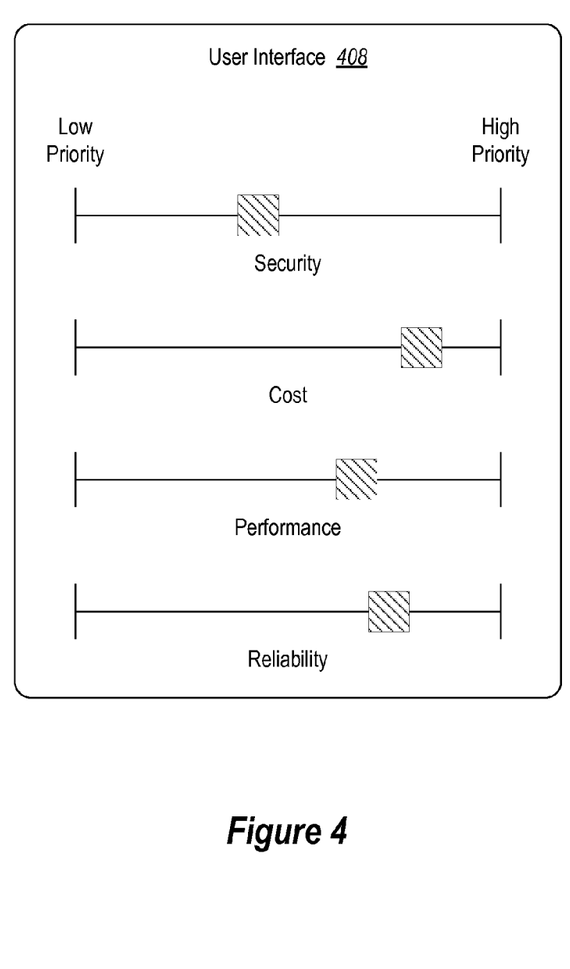
FIG. 4 illustrates an embodiment in which user preferences are received at a user interface.

The application 509 to be hosted by the cloud may be taken into account when evaluating the potential target clouds. The evaluation module 530 may also use user preferences 507 from user 505. The user preferences may indicate the relative importance of each of a plurality of hosting criteria. For instance, as shown in FIG. 4, a user may use slider bars (or another input type) to indicate how important security, cost, performance and reliability are to the user for that specific application. The user interface 108 may show other criteria not shown in FIG. 4. In the embodiment shown in FIG. 4, the user has indicated that cost is relatively more important than security for that application. For other applications, the preferences may be different (e.g. security may be prioritized above all other criteria). Thus, based on both the user's preferences and the application that is to be hosted (i.e. the workload caused by the application), the evaluation module 530 assigns a star (or other) rating 538 to each potential target cloud. For the specific application shown in FIG. 5, target cloud 535C has the highest rating (four stars), indicating that it is best suited to hosting the application, based on the user's preferences and the workload of the application.

Accordingly, the evaluation module may make two determinations: 1) should the application be moved (i.e. is there a better cloud more suited to this application?) and 2) which target cloud is best suited to host the application. In some embodiments, the potential target clouds may not have each of the criteria the user is looking for (e.g. not as much processing power or not as much security). As such, the user may be asked to compromise on a target cloud, and may be shown an indication of which clouds fit most of the user's preferences, and which preferences would not be met by each of the clouds. The user may also be shown (via the user interface 108) which alternate clouds may be used to host their application.

Method 300 further includes an act of presenting the available cloud computing systems to one or more users via a user interface, each cloud computing system being presented with its corresponding service rating as determined by the evaluation (act 330). Thus, user interface 108 may show the various potential target clouds 535A-C to the user along with their assigned ratings. The rating may change as time moves along. For instance, one of the potential target clouds may stop hosting another application, thus freeing up some of its resources. As a result, the evaluation module 530 may re-evaluate the cloud and raise (or lower) its rating accordingly.

Accordingly, methods, systems and computer program products are provided which migrate and reinitiate an application on a target computing cloud. Moreover, methods, systems and computer program products are provided which evaluate potential target cloud computing systems and assign them ratings based on which is most able to host the user's application.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, causes the computing system to perform a method for reinitiating an application on a target computing cloud, the method comprising the following:
receiving an indication that identifies a target cloud computing system to which an application is to be migrated, the target cloud computing system including a specified set of hardware specifications, a set of environment settings, one or more associated configuration settings and an assigned rating that indicates how well the application will perform on the target cloud computing system;
determining differences between the specified set of hardware specifications, set of environment settings, and one or more associated configuration settings of the target host cloud and a set of hardware specifications, set of environment settings, and one or more associated configuration settings of a current host cloud;
determining, based on the determined differences and at least one of the hardware specifications, the environment settings and the configuration settings of the target cloud computing system, that the application is to be reconfigured for compatibility with the target cloud computing system;
based on the determination, reconfiguring one or more portions of the application to comply with at least one of the hardware specifications, the environment settings and the configuration settings of the target cloud computing system;
identifying which one or more portions of the application are to be transferred to the target cloud computing system based on the reconfiguration;
transferring the identified application portions to the target cloud computing system; and
indicating to the target cloud computing system that the application is to be re-instantiated on the target cloud computing system using the transferred application portions.

2. The computer system of claim 1, wherein re-initiating the application includes mapping the application to an existing application on the target cloud computing system.

3. The computer system of claim 2, wherein mapping the application to an existing application on the target cloud computing system comprises:
determining, based on at least one of the hardware specifications, the environment settings and the configuration settings of the target cloud computing system, that the application is to be mapped to one or more portions of an existing application on the target cloud computing system;
based on the determination, mapping the application to the one or more portions of the existing application on the target cloud computing system;
identifying which one or more portions of the application are to be transferred to the target cloud computing system based on the mapping;
transferring the identified application portions to the target cloud computing system; and
indicating to the target cloud computing system that the application is to be re-instantiated on the target cloud computing system using the mapped and transferred application portions.

4. The computer system of claim 3, wherein one or more previous mappings are used to map the application to the one or more portions of the existing application on the target cloud computing system.

5. The computer system of claim 4, wherein user-confirmed mappings are used on subsequent application transfers for applications that are determined to be substantially similar.

6. The computer system of claim 1, wherein the assigned rating is generated based on one or more criteria including security, reliability, price and energy savings.

7. The computer system of claim 6, wherein a plurality of target cloud computing systems are evaluated using the one or more criteria to determine an optimal target cloud on which the application is to be reinitiated.

8. The computer system of claim 1, wherein the target cloud computing system comprises at least one of a private cloud and a public cloud.

9. The computer system of claim 1, wherein a plurality of applications are reconfigured and reinitiated on the target cloud computing system simultaneously.

10. The computer system of claim 1, further comprising:
determining one or more subsequent actions that are to be performed to reinitiate the application on the target cloud computing system; and
performing the determined one or more subsequent actions to reinitiate the application on the target cloud computing system.

11. The computer system of claim 1, wherein transferring the identified application portions to the target cloud computing system comprises transferring only application data.

12. The computer system of claim 1, wherein transferring the identified application portions to the target cloud computing system comprises transferring the application as a whole.

13. The computer system of claim 1, wherein transferring the identified application portions to the target cloud computing system comprises transferring a virtual disk on which the application is running.

14. A computer system comprising the following:
one or more processors;
system memory;
one or more computer-readable storage media having stored thereon computer-executable instructions that, when executed by the one or more processors, causes the computing system to perform a method for evaluating potential target cloud computing systems, the method comprising the following:
determining that one or more cloud computing systems are available for hosting an application;
evaluating the one or more cloud computing systems to determine which cloud computing system an application is to be migrated to, each cloud computing system including a specified set of hardware specifications, a set of environment settings, and associated configuration settings, the evaluation comprising determining a service rating for each cloud computing system that indicates whether the application is hostable by the target cloud computing system and how well the application will perform on the target cloud computing system; and determining differences between the specified set of hardware specifications, set of environment settings, and one or more associated configuration settings of the each cloud computing system and a set of hardware specifications, set of environment settings, and one or more associated configuration settings of a current host cloud;

presenting the available cloud computing systems to one or more users via a user interface, each cloud computing system being presented with its corresponding service rating indicating how well the application will perform on the each cloud computing system.

15. The computer system of claim 14, further comprising:
receiving an indication that identifies at least one of the cloud computing systems as a target cloud computing system to which the application is to be migrated;
determining, based on at least one of the hardware specifications, the environment settings, and the configuration settings of the target cloud computing system, whether the application is to be reconfigured for migration to the target cloud computing system or whether the application is to be mapped to an existing application on the target cloud computing system;
based on the determination, performing at least one of the following:
reconfiguring one or more portions of the application to comply with at least one of the hardware specifications, the environment settings and the configuration settings of the target cloud computing system; and
mapping the application to one or more portions of an existing application on the target cloud computing system;
identifying which one or more portions of the application are to be transferred to the target cloud computing system based on the mapping or reconfiguration;
transferring the identified application portions to the target cloud computing system; and
indicating to the target cloud computing system that the migrated application is to be re-instantiated on the target cloud computing system using the transferred application portions.

16. The computer system of claim 14, further comprising receiving one or more user preferences from a user indicating the relative importance of each of a plurality of hosting criteria.

17. The computer system of claim 16, wherein the service rating is determined using the user's preferences in addition to the specified set of hardware specifications, the environment settings and associated configuration settings.

18. The computer system of claim 17, wherein the user interface prompts the user to indicate one or more preferences that the user is willing to compromise.

19. The computer system of claim 14, wherein the service rating is determined based on the specified set of hardware specifications, the environment settings, the associated configuration settings of the cloud and an identified workload resulting from the application that is to be reinitiated on the target cloud.

20. A computer system comprising the following:
one or more processors;
system memory;
one or more computer-readable storage media having stored thereon computer-executable instructions that, when executed by the one or more processors, causes the computing system to perform a method for evaluating potential target cloud computing systems, the method comprising the following:
determining that one or more cloud computing systems are available for hosting an application;
evaluating the one or more cloud computing systems to determine which cloud computing system an application is to be migrated to, each cloud computing system including a specified set of hardware specifications, a set of environment settings and associated configuration settings, the evaluation comprising determining a service rating for each cloud computing system that indicates whether the application is hostable by the target cloud computing system and how well the application will perform on the target cloud computing system;
presenting the available cloud computing systems to one or more users in a user interface, each cloud computing system being presented with its corresponding service rating as determined by the evaluation;
receiving at the user interface an indication that identifies at least one of the cloud computing systems as a target cloud computing system to which the application is to be migrated;
determining differences between the specified set of hardware specifications, set of environment settings, and one or more associated configuration settings of the target host cloud and a set of hardware specifications, set of environment settings, and one or more associated configuration settings of a current host cloud for the application;
determining, based on the determined differences and at least one of the hardware specifications, the environment settings and the configuration settings of the target cloud computing system, whether the application is to be reconfigured for migration to the target cloud computing system or whether the application is to be mapped to an existing application on the target cloud computing system;
based on the determination, performing at least one of the following:
reconfiguring one or more portions of the application to comply with at least one of the hardware specifications, the environment settings and the configuration settings of the target cloud computing system, and
mapping the application to one or more portions of an existing application on the target cloud computing system;
identifying which one or more portions of the application are to be transferred to the target cloud computing system based on the mapping or reconfiguration;
transferring the identified application portions to the target cloud computing system; and
indicating to the target cloud computing system that the migrated application is to be re-instantiated on the target cloud computing system using the transferred application portions.

* * * * *